United States Patent
Emori

(10) Patent No.: US 9,874,798 B2
(45) Date of Patent: Jan. 23, 2018

(54) ELECTROPHORETIC DISPLAY SUBSTRATE, METHOD OF INSPECTING SAME, AND ELECTROPHORETIC DISPLAY DEVICE

(71) Applicant: TOPPAN PRINTING CO., LTD., Taito-ku (JP)

(72) Inventor: Akira Emori, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 191 days.

(21) Appl. No.: 14/628,332

(22) Filed: Feb. 23, 2015

(65) Prior Publication Data

US 2015/0168799 A1 Jun. 18, 2015

Related U.S. Application Data

(63) Continuation of application No. PCT/JP2013/004905, filed on Aug. 20, 2013.

(30) Foreign Application Priority Data

Aug. 22, 2012 (JP) ................................ 2012-183290

(51) Int. Cl.
*G02F 1/133* (2006.01)
*G02F 1/167* (2006.01)
(Continued)

(52) U.S. Cl.
CPC ............ *G02F 1/167* (2013.01); *G01M 11/30* (2013.01); *G01R 31/02* (2013.01);
(Continued)

(58) Field of Classification Search
CPC ............ G02F 1/167; G02F 1/133514; G02F 2001/136254; G02F 1/1309;
(Continued)

(56) References Cited

U.S. PATENT DOCUMENTS

| 4,139,278 A * | 2/1979 | Matsumoto | G03B 17/20 |
| | | | 252/500 |
| 8,106,399 B2 * | 1/2012 | Park | G02F 1/136213 |
| | | | 257/59 |

(Continued)

FOREIGN PATENT DOCUMENTS

| CN | 101762923 A | 6/2010 |
| EP | 1 010 036 | 6/2000 |

(Continued)

OTHER PUBLICATIONS

International Search Report dated Oct. 29, 2013 in PCT/JP2013/004905 (with English Translation).

(Continued)

*Primary Examiner* — Julian Huffman
*Assistant Examiner* — Michael Konczal
(74) *Attorney, Agent, or Firm* — Oblon, McClelland, Maier & Neustadt, L.L.P.

(57) ABSTRACT

An electrophoretic display substrate includes an electrophoretic display layer which is interposed between a first substrate and a second substrate and includes at least one electrophoretic ink display element which is charged. The first substrate includes a thin film transistor, a sub pixel electrode, a capacitor element including a first electrode and a second electrode, capacitor element electrode lines connected to the second electrode, and common electrode lines. The second substrate has a first surface on which a common electrode is formed and a second surface on which a color filter layer is formed. The common electrode is connected to the common electrode lines of the first substrate. The color filter layer includes a transparent resin which is laminated on the second substrate and color filter pixels which are formed on the transparent resin.

20 Claims, 12 Drawing Sheets

(51) Int. Cl.
*G01M 11/00* (2006.01)
*G01R 31/02* (2006.01)
*G02F 1/1335* (2006.01)
*G02F 1/1362* (2006.01)
*G02F 1/13* (2006.01)

(52) U.S. Cl.
CPC ...... *G02F 1/133514* (2013.01); *G02F 1/1309* (2013.01); *G02F 1/136213* (2013.01); *G02F 2001/133562* (2013.01); *G02F 2001/136254* (2013.01)

(58) Field of Classification Search
CPC ... G02F 1/136213; G02F 2001/133562; G02F 2001/1672; G01M 11/30; G01R 31/02; G09G 3/344; G09G 3/3446
See application file for complete search history.

(56) References Cited

U.S. PATENT DOCUMENTS

| | | | | |
|---|---|---|---|---|
| 8,372,664 | B2* | 2/2013 | Tsuji | H01L 27/1225 257/432 |
| 8,797,637 | B2* | 8/2014 | Fujishiro | G02B 5/201 359/296 |
| 2007/0234151 | A1 | 10/2007 | Hsu et al. | |
| 2011/0026099 | A1* | 2/2011 | Kwon | G02F 1/167 359/296 |
| 2011/0157681 | A1 | 6/2011 | Kwon et al. | |
| 2011/0170169 | A1 | 7/2011 | Komatsu et al. | |
| 2013/0314764 | A1* | 11/2013 | Doi | G02F 1/167 359/296 |

FOREIGN PATENT DOCUMENTS

| | | | | |
|---|---|---|---|---|
| EP | 2674810 | A1 * | 12/2013 | ............ G02F 1/167 |
| JP | 2-72392 | A | 3/1990 | |
| JP | 6-82836 | A | 3/1994 | |
| JP | 7-294374 | A | 11/1995 | |
| JP | 3837948 | | 8/2006 | |
| JP | 2008-134600 | A | 6/2008 | |
| JP | 2009-229522 | | 10/2009 | |
| JP | 2011-39134 | A | 2/2011 | |
| JP | 2011-145391 | | 7/2011 | |
| JP | 2011-158559 | A | 8/2011 | |
| JP | 2012-48097 | A | 3/2012 | |
| WO | WO 99/10767 | A1 | 3/1999 | |
| WO | WO 2011/155410 | A1 | 12/2011 | |
| WO | 2012/108431 | | 8/2012 | |

OTHER PUBLICATIONS

Office Action dated Jul. 7, 2015 in Japanese Patent Application No. 2014-051957 (with English language translation).
Extended European Search Report dated Apr. 19, 2016 in Patent Application No. 13831461.2.
Office Action issued Apr. 30, 2015 in Japanese Patent Application No. 2014-051957 (with English language translation).
Combined Office Action and Search Report dated Mar. 30, 2017 in Chinese Patent Application No. 201380024999.7 (with English translation and English translation of category of cited documents).

* cited by examiner

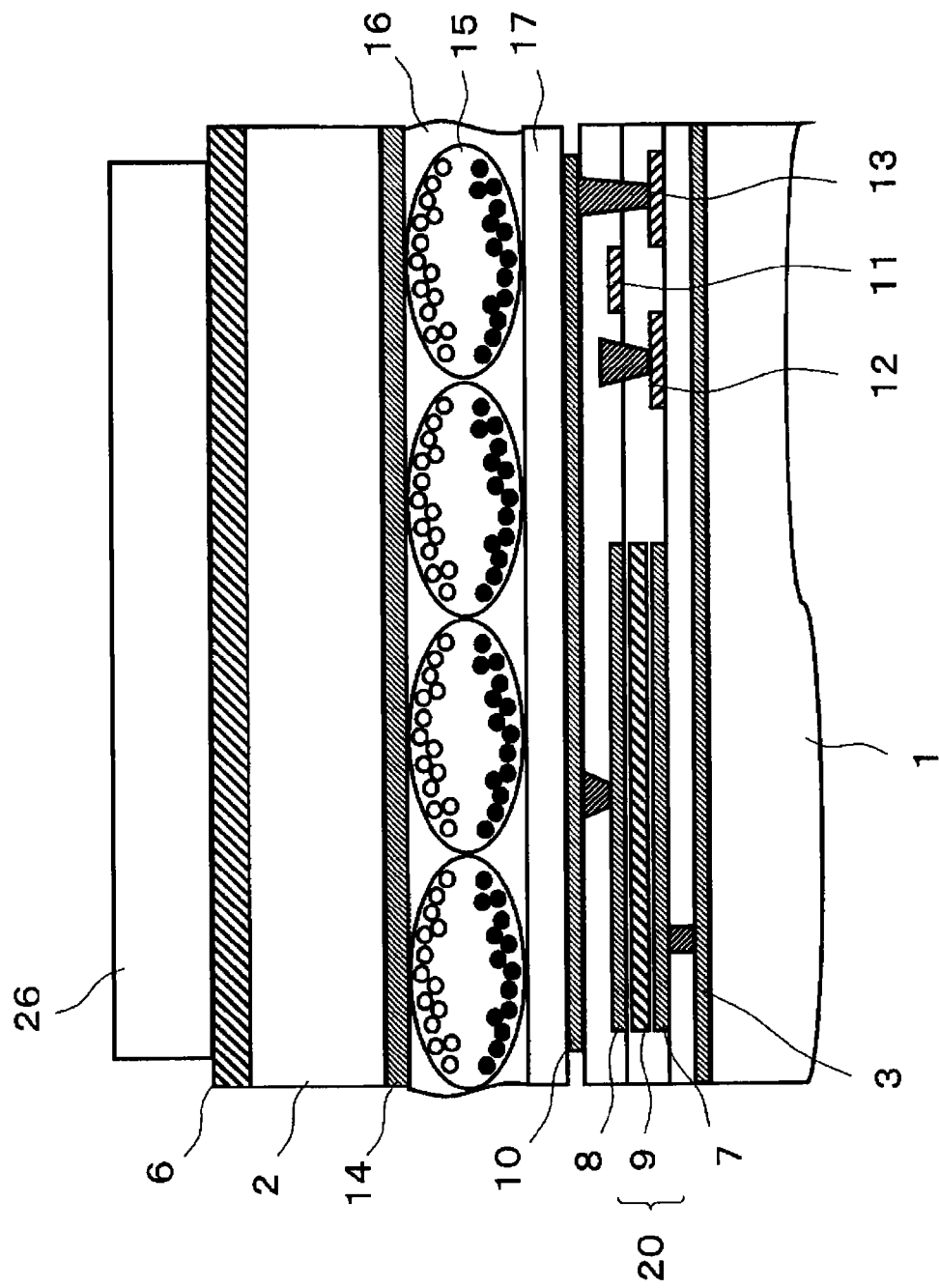

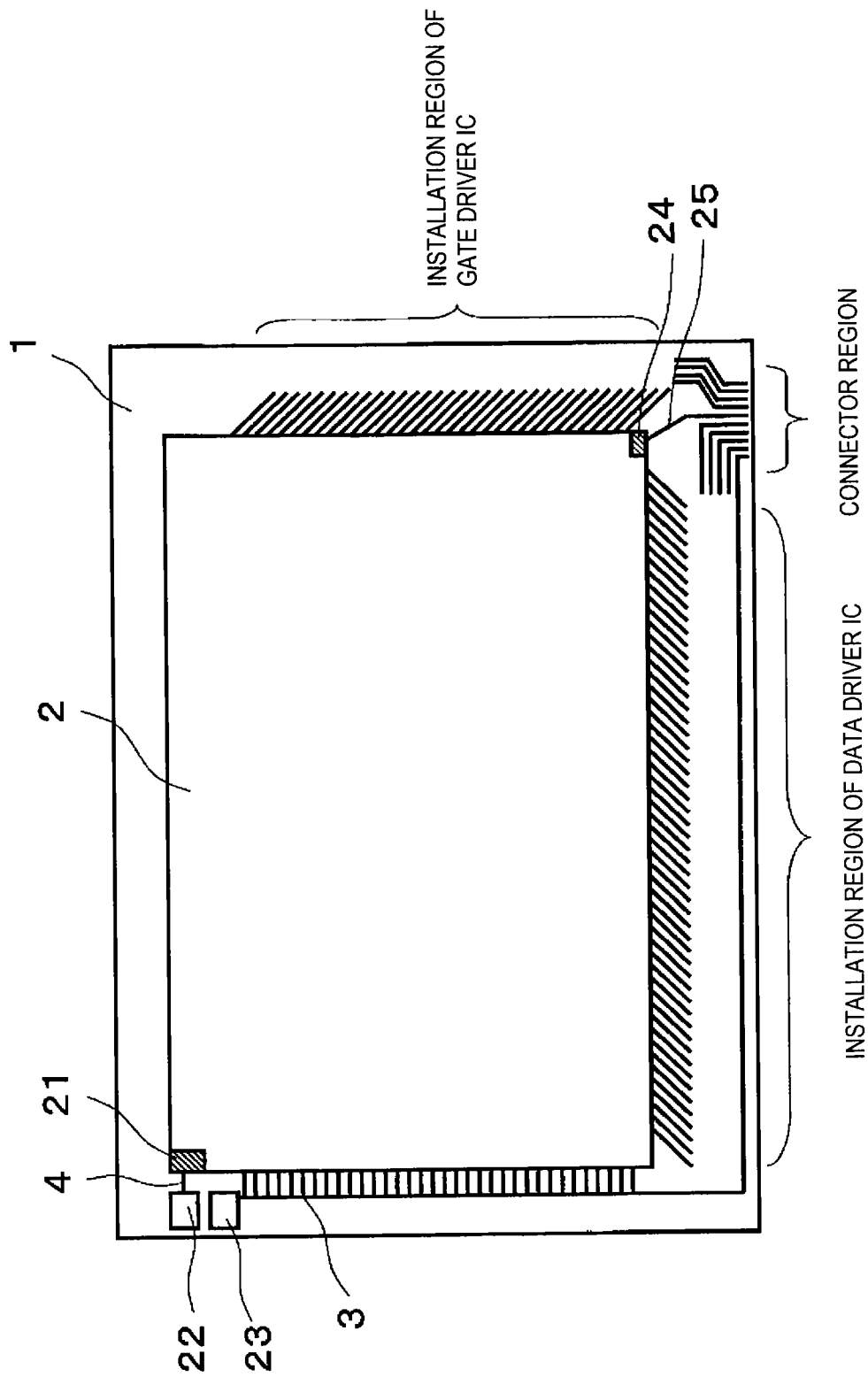

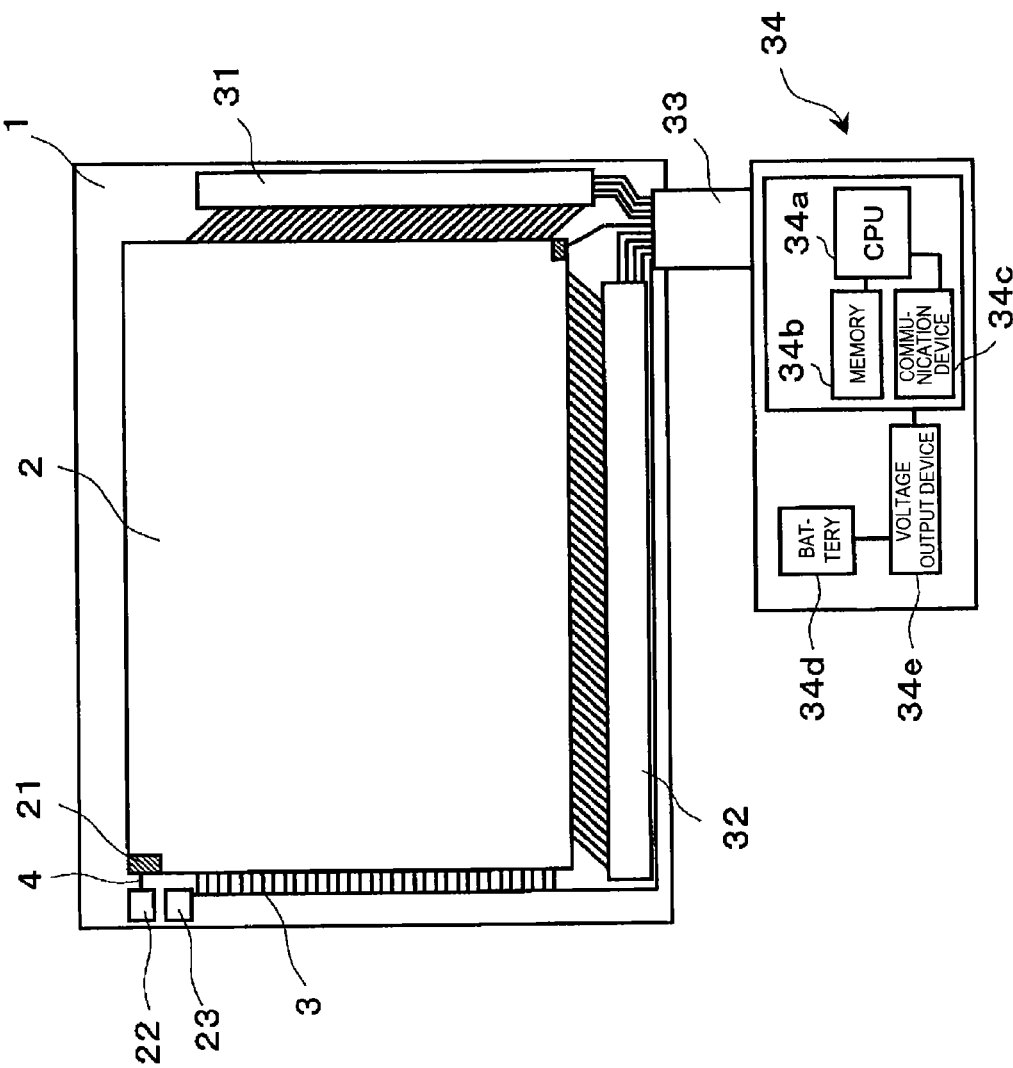

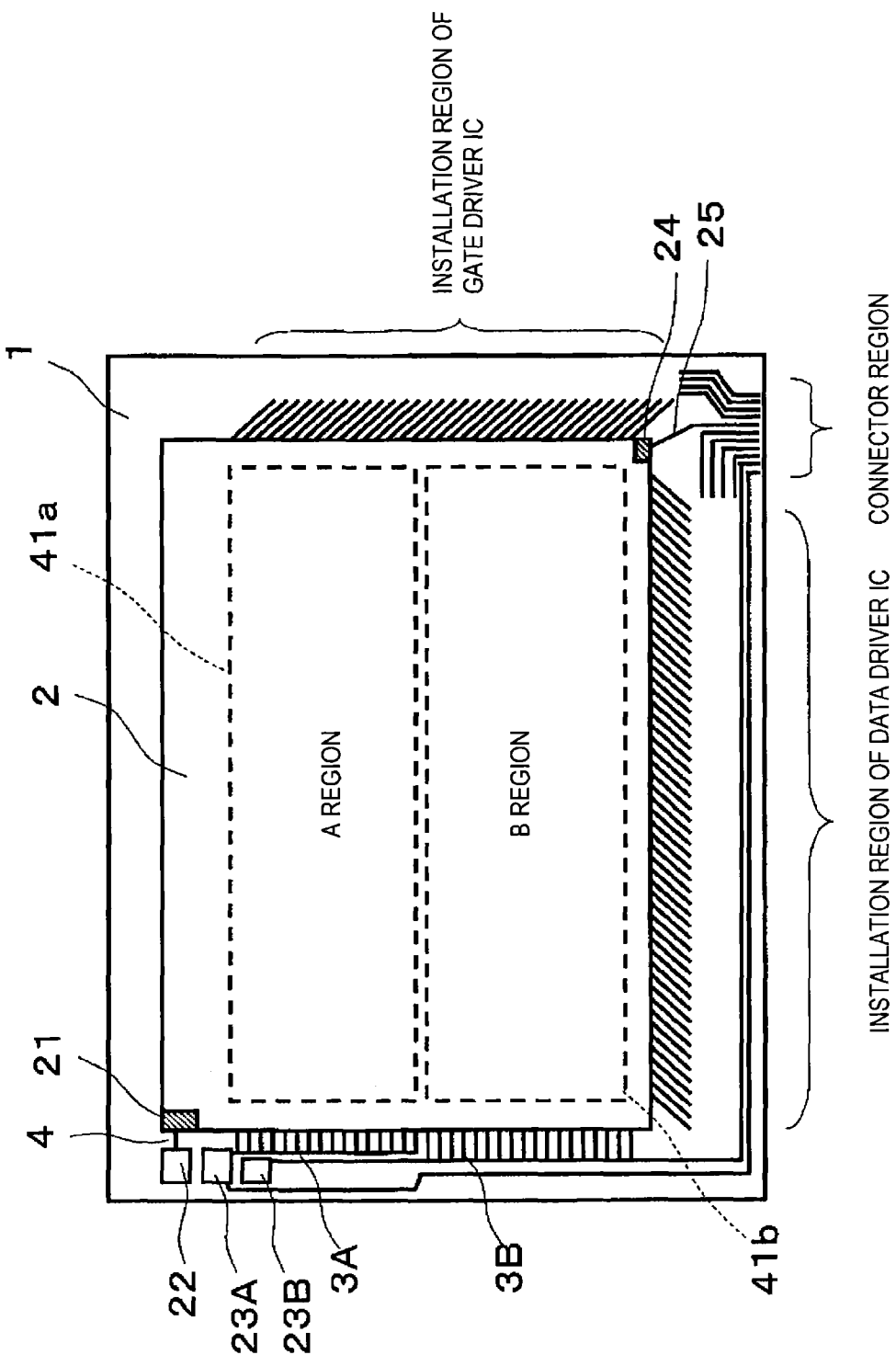

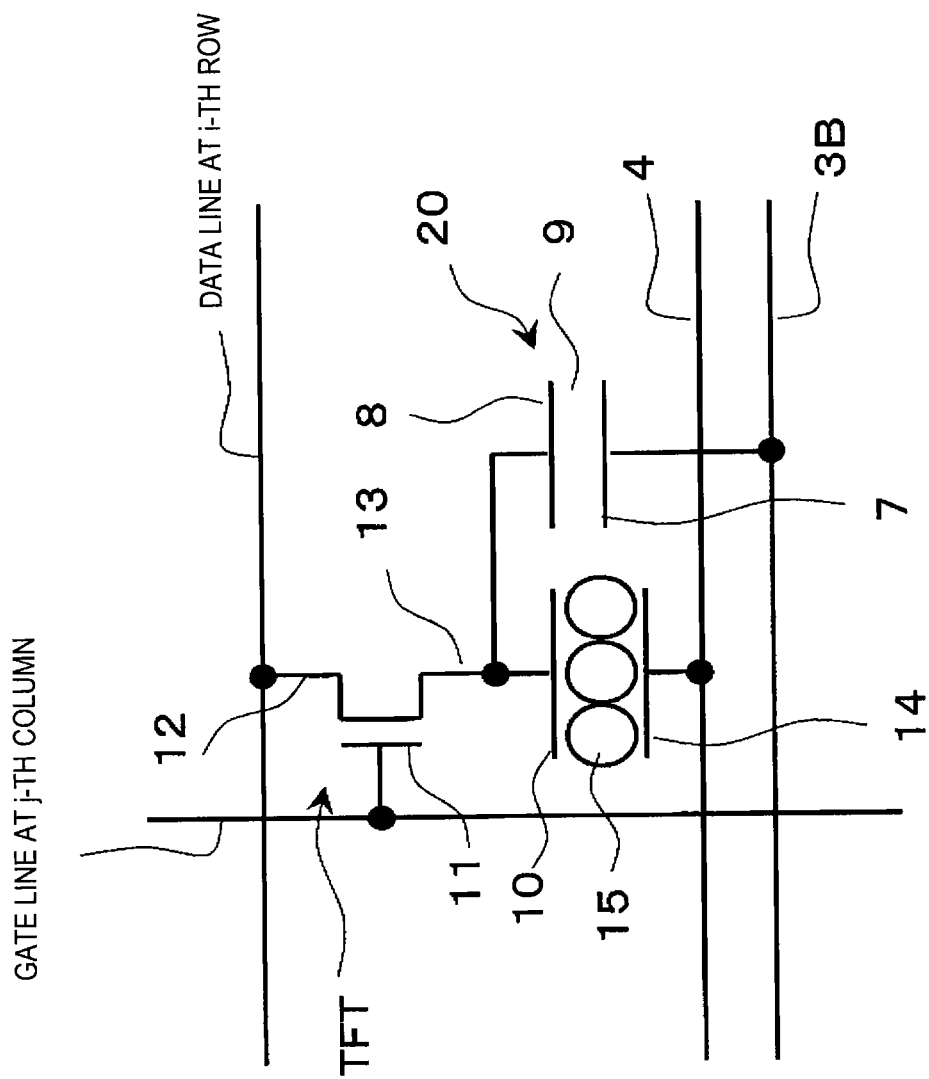

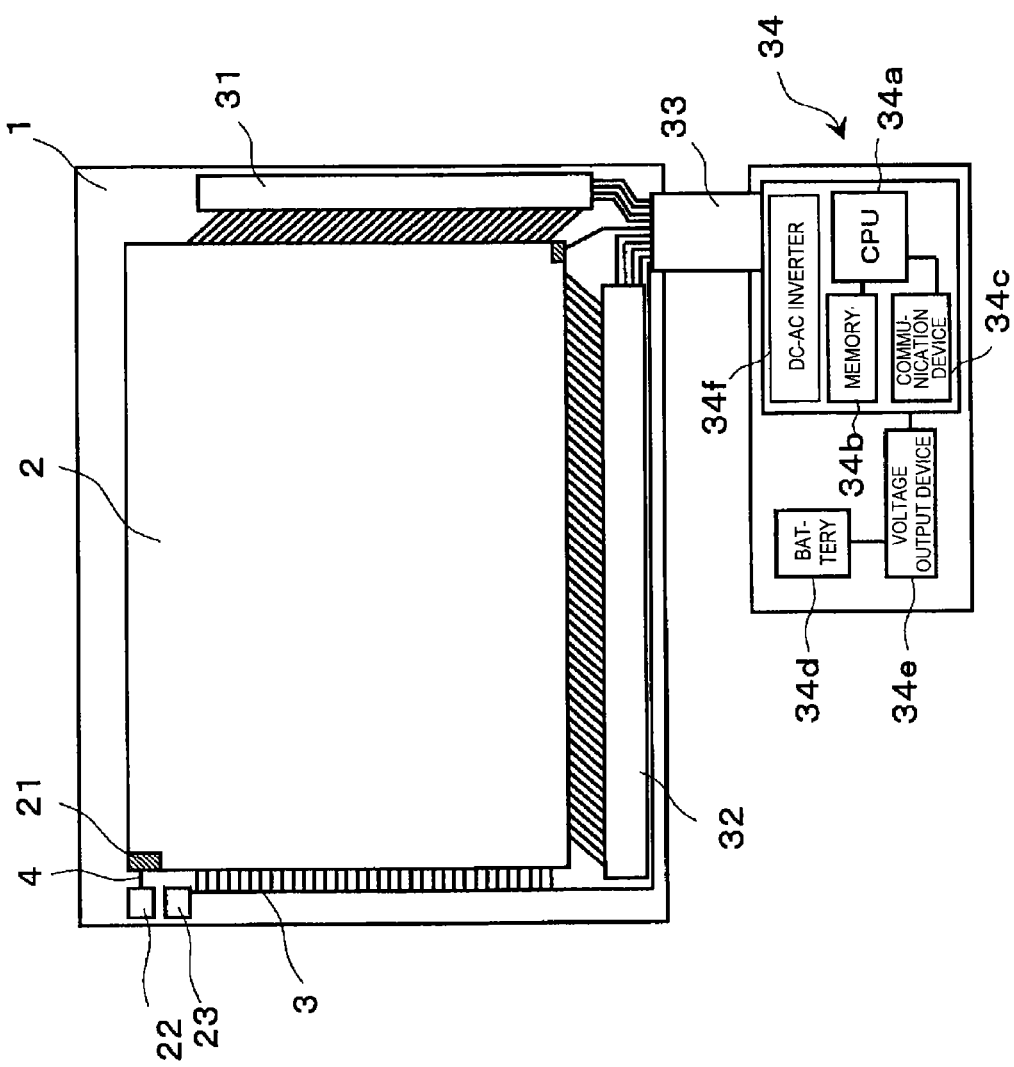

US 9,874,798 B2

ELECTROPHORETIC DISPLAY SUBSTRATE, METHOD OF INSPECTING SAME, AND ELECTROPHORETIC DISPLAY DEVICE

CROSS-REFERENCE TO RELATED APPLICATIONS

The present application is a continuation of International Application No. PCT/JP2013/004905, filed Aug. 20, 2013, which is based upon and claims the benefits of priority to Japanese Application No. 2012-183290, filed Aug. 22, 2012. The entire contents of these applications are incorporated herein by reference.

BACKGROUND OF THE INVENTION

Technical Field

The present invention relates to an electrophoretic display substrate, particularly, an electrophoretic display substrate capable of performing display inspection by applying a voltage to an electrophoretic display element and allowing whole electrophoretic display elements to be discolored to have a color with a predetermined wavelength using a driving circuit having a simple configuration without mounting a driver IC or a cable in the electrophoretic display substrate, a method of inspecting an electrophoretic display substrate using the same, and an electrophoretic display device.

Background Art

An electrophoretic display substrate which is a display substrate that holds an image even when supply of power to an image display element is cut comes into practical use and is widespread as a display substrate of an e-book or an electronic shelf label. As typical examples of the electrophoretic display substrate which comes into practical use, a microcapsule-type electrophoretic display substrate (manufactured by E lnk, Inc.) and a microcup-type electrophoretic display substrate (manufactured by Sipix, Inc.) are exemplified. In the former case, a liquid obtained by allowing white and black colored particles which are respectively positively and negatively charged to be dispersed in a non-polar and transparent dispersion medium is sealed in a microcapsule, which is used as a display element and is made into a flat display substrate that is arranged on a substrate, on which an electrode is formed, in high density. Meanwhile, in the latter case, countless recesses referred to as microcups are formed in a substrate and a sheet which seals positively or negatively charged colored particles and a non-polar colored liquid in the recesses is used in application as a flat display substrate.

In both systems, an electrophoresis phenomenon in which colored particles are moved by applying a voltage to the charged colored particles due to an electrostatic attraction force is used, and the display substrate has a holding property of an image by the moved colored particles remaining in the moved place even when the application of a voltage is stopped.

Since the color of an image which can be displayed by these electrophoretic display substrates is determined by a combination of colors of charged colored particles or colored liquid, it is necessary to display a full color image using a mixture of colors with three primary colors such as red (R), green (G), and blue (B) or cyan (C), magenta (M), and yellow (Y) in order to display a full color image. At this time, a region displaying a color of three primary colors such as R, G, and B is referred to as a sub pixel, and a combination of sub pixels of three primary colors is referred to as a color pixel. The color pixel having the smallest number of sub pixels among combinations of sub pixels constituting a color pixel is a color pixel formed of three sub pixels including one sub pixel of R, one sub pixel of G, and one sub pixel of B.

SUMMARY OF INVENTION

According to one aspect of the present invention, an electrophoretic display substrate includes a first substrate, a second substrate, and an electrophoretic display layer interposed between the first substrate and the second substrate. The electrophoretic display layer includes at least one electrophoretic ink display element which is positively or negatively charged. The first substrate includes a thin film transistor positioned at an intersection between a gate line and a data line, a sub pixel electrode, a capacitor element including a first electrode and a second electrode, capacitor element electrode lines connected to the second electrode, and common electrode lines. The thin film transistor has a source terminal and a drain terminal and is structured such that one of the source and drain terminals is connected to the data line, and that the other of the source and drain terminals is connected to the sub pixel electrode and the first electrode of the capacitor element. The second substrate has a first surface on which a common electrode is formed and a second surface on which a color filter layer is formed. The common electrode is connected to the common electrode lines of the first substrate. The color filter layer includes a transparent resin which is laminated on the second substrate and color filter pixels which are formed on the transparent resin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1B is a cross-sectional view illustrating a configuration of one sub pixel included in the electrophoretic display substrate of FIG. 1A.

FIG. 3 is a top view illustrating wirings formed in the electrophoretic display substrate according to an embodiment of the present invention.

FIG. 4 is a block diagram illustrating a configuration of an electrophoretic display device using the electrophoretic display substrate according to an embodiment of the present invention.

FIG. 5A is a block diagram illustrating another configuration of the electrophoretic display device using the electrophoretic display substrate according to an embodiment of the present invention.

FIG. 5C is a circuit diagram illustrating a pixel configuration in another divided region of the electrophoretic display device of FIG. 5A.

FIG. 6C is a block diagram illustrating the configuration of the electrophoretic display device using the electrophoretic display substrate of FIG. 6A or 6B.

DETAILED DESCRIPTION OF THE EMBODIMENTS

Figure 1A:
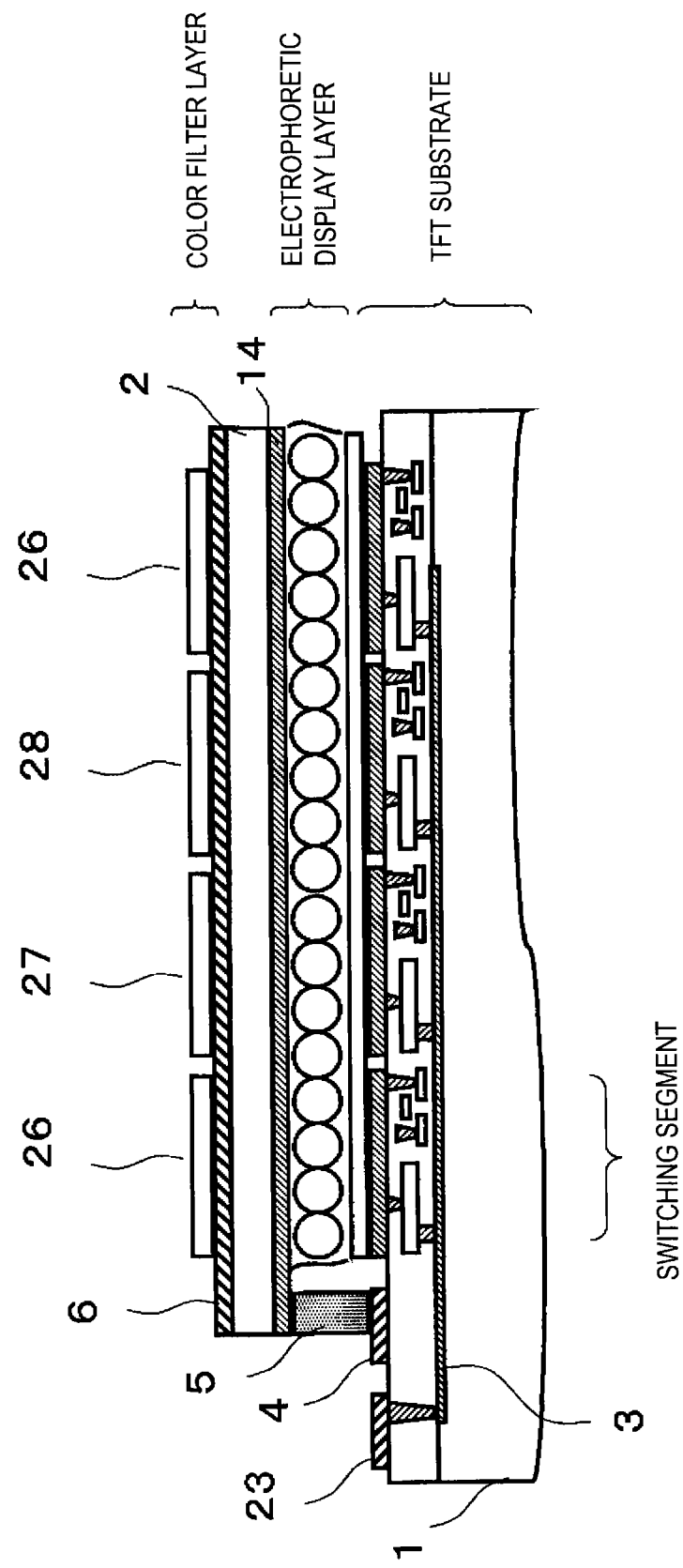
FIG. 1A is a cross-sectional view illustrating a configuration of an electrophoretic display substrate according to an embodiment of the present invention.

The embodiments will now be described with reference to the accompanying drawings, wherein like reference numerals designate corresponding or identical elements throughout the various drawings.

Hereinafter, an electrophoretic display substrate of the present invention will be described in detail with reference to the accompanying drawings. In the present embodiment, the present invention will be described by exemplifying a color electrophoretic display substrate forming a color filter on the surface of a display with an ink-jet printing using a microcapsule in which a transparent dispersion medium and positively or negatively charged white or black electrophoretic particles are sealed as an electrophoretic ink display element. The present invention, however, is not limited to the following.

The electrophoretic display substrate according to an embodiment of the present invention has a configuration as illustrated in FIGS. 1A to 1D.

Figure 1C:
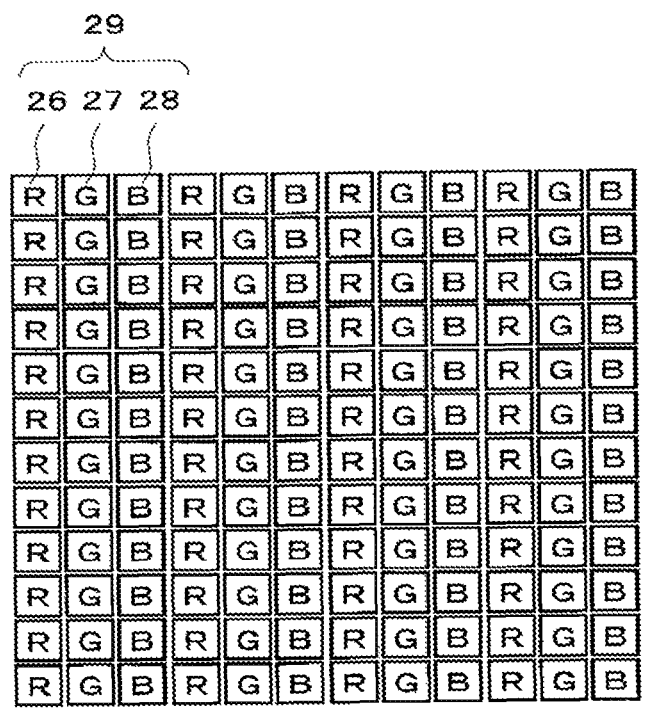
FIG. 1C is a top view illustrating arrangement of a color filter included in the electrophoretic display substrate of FIG. 1A.
Figure 1D:
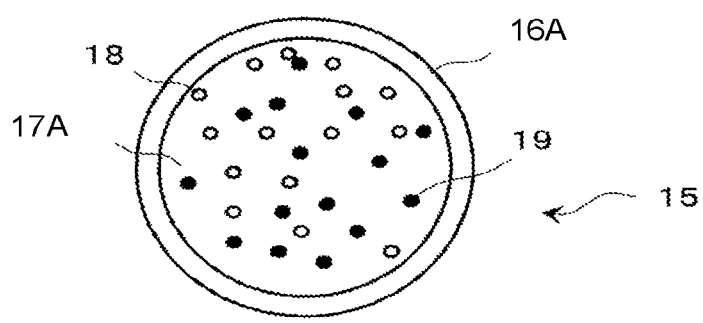
FIG. 1D is a view illustrating a configuration of a microcapsule of an electrophoretic ink display element included in the electrophoretic display substrate of FIG. 1A.

FIG. 1A is a cross-sectional view of the electrophoretic display substrate, FIG. 1B is a cross-sectional view illustrating a configuration of one sub pixel, FIG. 1C is a plan view illustrating arrangement of a color filter, and FIG. 1D is a configuration view illustrating a microcapsule of the electrophoretic ink display element.

In the electrophoretic display substrate, as illustrated in FIG. 1A, a transparent conductive film (ITO film or the like) which is a common electrode (14) is formed on one surface of a second substrate (2) having a transparent insulation property, for example, glass or a polymer resin film such as polyethylene terephthalate, acryl, polycarbonate, or polypropylene, and, as illustrated in FIG. 1B, a microcapsule layer having a film thickness of 20 μm to 60 μm is formed by coating the transparent conductive film with a liquid allowing a microcapsule which is an electrophoretic ink display element (15) to be uniformly dispersed in a binder resin (16) having light transparency using various coating methods such as screening printing, spin coating, and dip coating, and by drying.

A conductive adhesive layer (17) is formed on a surface side which is not in contact with the common electrode (14) of the microcapsule layer, and both the microcapsule layer and the conductive adhesive layer (17) are collectively referred to as an electrophoretic display layer. An electrophoretic display layer may include a dispersion medium and at least one kind of electrophoretic ink display element (15).

Here, the electrophoretic display layer including the electrophoretic ink display element performs microcapsule-type electrophoretic display, but may perform microcup-type electrophoretic display. In addition, a laminate formed of the second substrate (2), the common electrode (14), and the microcapsule layer is referred to as an electrophoretic display front plane laminate. The electrophoretic display front plane laminate is adhered to the sub pixel electrode (10) of the TFT substrate through the conductive adhesive layer (17). As a result, the common electrode (14) which is an entire surface electrode and the sub pixel electrode (10) divided into the pixel unit face to each other with the microcapsule which is the electrophoretic display element (15) being interposed therebetween at constant intervals.

In addition, a color filter layer is formed on a surface on which the common electrode (14) of the second substrate (2) having a transparent insulation property of the electrophoretic display substrate or the microcapsule display layer is not laminated. The color filter layer includes color filter pixels having three primary colors of red (R), green (G), and blue (B), and each of the color pixels is formed in a position facing the sub pixel electrode (10) of the TFT substrate. The color filter pixels are formed using various printing methods such as ink-jet printing, screening printing, offset printing, and flexographic printing. Particularly, in a case where color filter pixels are formed using ink-jet printing, an ink receiving layer (6) made of a transparent resin such as urethane or acryl is formed on the surface of the second substrate (2) having a transparent insulation property and color filter pixels are formed on the ink receiving layer (6).

As illustrated in FIG. 1C, in the two-dimensional arrangement in which color pixels having three primary colors of red (R), green (G), and blue (B) are arranged in order in the row direction and the column direction, particularly, the color filter layer is formed in the position facing the sub pixel electrode (10) of the TFT substrate in a stripe arrangement in which the same colors are arranged in the column direction.

The electrophoretic ink display element (15) in the electrophoretic display substrate includes a hollow capsule shell (16A) having a diameter of 20 μm to 60 μm with light transparency as illustrated in FIG. 1D. The capsule shell (16A) is formed of a methacrylic acid resin, a urea resin, and gum arabic and is filled with the non-polar dispersion medium (17A) such as silicone oil or long-chain hydrocarbon, which has light transparency and high viscosity therein. Positively charged white particles (18) made of titanium oxide and negatively charged black particles (19) made of carbon black are dispersed to the dispersion medium (17A).

When the electrophoretic ink display element (15) is interposed between two electrodes and a voltage is applied to respective electrodes, electrophoresis that moves negatively charged black particles (19) to the electrode side to which a positive voltage is applied and positively charged white particles (18) to the electrode side to which a negative electrode is applied in the dispersion medium is caused.

Hereinafter, the configuration of the TFT substrate having a function of applying a voltage to the electrophoretic display layer of the electrophoretic display substrate will be described with reference to FIG. 1B. The TFT substrate includes a capacitor element electrode line (3) in the first substrate (1) having a flat surface such as glass; a capacitor element (20) having a dielectric film (9) interposed between the first electrode (8) and the second electrode (7); the TFT (thin film transistor) having three terminals of a gate, source, and a drain; and a switching segment including the sub pixel electrode (10). In each electronic component constituting the switching segment, the second electrode (7) is connected to the capacitor element electrode line (3), and the first electrode (8) and a drain terminal (13) of the TFT are connected to the sub pixel electrode (10). The TFT includes a gate terminal (11), a source terminal (12), and the drain terminal (13), and has a function of controlling the current flowing between the source and drain terminals using a voltage applied to the gate terminal (11). In addition, the capacitor element (20) has a structure in which the dielectric film (9) is interposed between the first electrode (8) and the second electrode (7), and has a function of charging and discharging in which electric charges are stored in the capacitor element (20) when a current flows between the first electrode (8) and the second electrode (7) and the stored electric charges are released when supply of the current is stopped.

Here, the source and the drain of the TFT will be described. In the source and the drain of the TFT, the terminal with a low potential is defined as a source in an N-type transistor and the terminal with a high potential is defined as a source in a P-type transistor. In the electrophoretic display substrate, since a voltage is applied to the source or the drain of the TFT such that a positive or negative voltage is applied to the sub pixel electrode (10), the source and the drain of the TFT are switched due to the positive or negative of the voltage to be applied by definition. In the present specification, for a purpose of clear description, the terminal connected to the sub pixel electrode (10) is referred to as the drain and the other is referred to as the source.

In the electrophoretic display substrate, a plurality of the switching segments are arranged in the row or column direction in the first substrate (1) to become the TFT substrate. With such a configuration, an arbitrary image can be displayed. Specifically, a desired image can be displayed by making the common electrode (14) of the second substrate (2) of the electrophoretic display substrate into a transparent electrode such as ITO, by allowing the sub pixel electrode (10) of the first substrate (1) to control on/off and positive/negative of a voltage to be applied using the TFT, and by controlling the moving state of the white particles (18) and the black particles (19) in a unit of the sub pixel electrode to arbitrarily change the amount of reflected light incident from the transparent electrode side.

Moreover, in the electrophoretic display substrate, since the color pixels having three primary colors of red (R) color pixels (26), green (G) color pixels (27), and blue (B) color pixels (28) are formed on the surface of the second substrate facing the sub pixel electrode (10) in a unit of a sub pixel electrode, it is possible to independently display each of red, green, and blue having arbitrary brightness in accordance with the amount of reflected light of the electrophoretic ink display element (15) in respective sub pixels. In this manner, when a combination of red (R), green (G), and blue (B) sub pixels is used as one pixel (29), display of a full color image becomes possible by mixing three primary colors. Three primary colors may be cyan (C), magenta (M), and yellow (Y).

Figure 2:
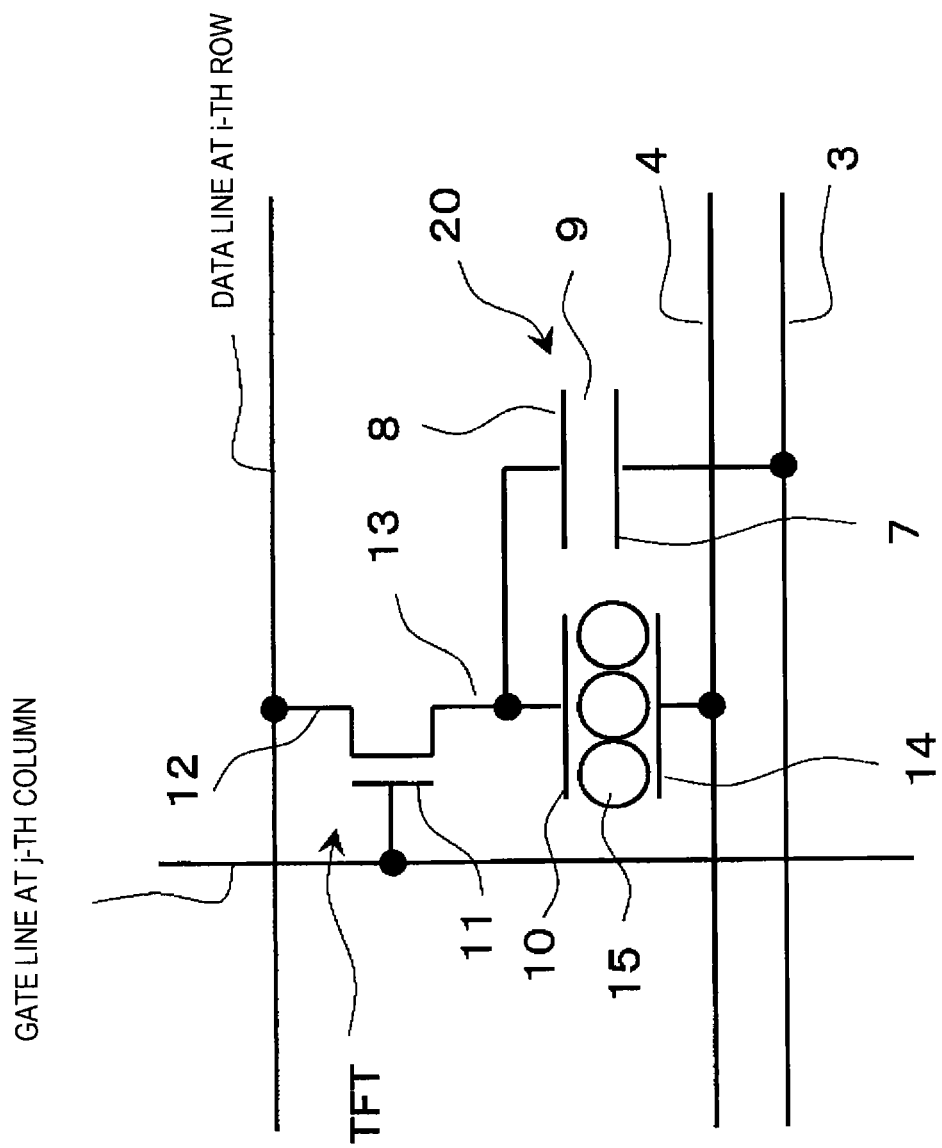
FIG. 2 is a circuit diagram illustrating a pixel configuration of the electrophoretic display substrate according to an embodiment of the present invention.

FIG. 2 illustrates an equivalent circuit of one sub pixel of the electrophoretic display substrate to which an embodiment of the present invention is applied.

A relationship of electrical connection among respective members of the electrophoretic display substrate according to an embodiment of the present invention will be described using the equivalent circuit of FIG. 2. FIG. 2 illustrates the relationship of electrical connection between the switching segment in the i-th row and j-th column and the electrophoretic ink display element (15) to be driven by the switching segment. The drain terminal (13) of the TFT and the first electrode (8) of the capacitor element (20) are connected to the sub pixel electrode (10) so that they have the same electric potential. In addition, the common electrode (14) is connected to the common electrode line (4). Further, the second electrode (7) of the capacitor element (20) is connected to the capacitor element electrode line (3) so as to have the same electric potential as the second electrode (7) of the capacitor element (20) of another switching segment. The gate terminal (11) of the TFT is connected to the gate line in the j-th column so that the gate terminal (11) of the entire switching segments arranged in the j-th column is connected by one gate line. Furthermore, the source terminal (12) of the TFT is connected to the data line in the i-th row so that the source terminal (12) of the TFT of the entire switching segments arranged in the i-row direction is connected by one data line.

In the electrophoretic display substrate, in a case where i×j number of sub pixel electrodes (10), which is the i row and j column, are present, i number of data lines and j number of gate lines are present and i or j number of capacitor element electrode lines (3) are present. Further, at least one common electrode line (4) connected to the common electrode (14) is present. These gate lines, data lines, capacitor element electrode lines, and common electrode lines are present in an electrically insulating relationship.

In a state in which the gate driver IC, the data driver IC, and the flexible cable for supplying power for driving the electrophoretic ink display element or for operating the TFT are not mounted and the TFT of respective switching segments cannot be operated, it is possible to drive the electrophoretic display layer by applying a voltage to the sub pixel electrode (10) of the entire switching segments by configuring the electrophoretic display substrate in the above-described manner. Specifically, a voltage is applied to a space between the sub pixel electrode (10) and the common electrode (14) through the capacitor element (20) by applying a voltage to the common electrode line (4) and the capacitor element electrode line (3), and it is possible for the electrophoretic ink display element (15) of the electrophoretic display layer to enter a state of an arbitrary reflectance, for example, white or black. For example, in a case where the potential of the common electrode line (4) is set to a standard potential, negatively charged black particles of the electrophoretic ink display element are migrated to the sub pixel electrode (10) side and positively charged white particles (18) are migrated to the common electrode side which is the observation side, and then the display color becomes white when a positive voltage is applied to the capacitor element electrode line (3). During this time, the entire sub pixel electrodes (10) are connected in parallel, and accordingly, the same voltage is applied to the electrophoretic ink display element (15) constituting the entire sub pixels and the display color becomes white having approximately the same reflectance. In this manner, when inspection on the color filter which is directly formed on the electrophoretic display substrate is performed, the entire color pixels on a screen can be evaluated using white having substantially the same reflectance as a reference, and accordingly, the inspection of the color filter becomes possible without mounting components such as various driver ICs or flexible cables on the TFT substrate.

FIG. 3 is a top view illustrating wirings formed in the electrophoretic display substrate according to an embodiment of the present invention. The second substrate (2) on which the electrophoretic ink display layer is formed is attached to the center of the first substrate (1), and a part of the ITO film which is the common electrode (14) formed on the second substrate (2) is connected to the common electrode lines of the first substrate (1) using a conductive adhesive (5) containing a metal such as silver as a main component in the common electrode connecting portions (21, 24). In the figure, two common electrode lines which are a common electrode line A (4) connected to the first electrode (22) for inspection in order to apply a voltage application probe for inspection and a common electrode line B (25) set as a connector electrode for electrical connection with a controller which is a control device for displaying an image on the electrophoretic display substrate are present, but both of the common electrode lines have the same electric potential by being connected to the ITO film which is the same common electrode (14). In an embodiment of the present invention, at least one common electrode line may be present on the first substrate (1), but the common electrode lines may be present in plural as long as the potential of the common electrode lines is electrically the same, and two common electrode lines are described in the same figure for simplifying the wirings. In the outer periphery portion of the first substrate (1) to which the second substrate (2) is not attached, an area for disposing the gate driver IC, an area for disposing the data driver IC, and a connector area in which the wirings drawn from these regions are collected to one place are present. In addition, a plurality of capacitor element electrode lines (3) are gathered into one line, and the line is connected to a second electrode (23) for inspection and wired to the connector region. Connector electrodes are arranged in the connector region at equivalent intervals and the connector electrodes include an electrode for controlling the gate driver IC, an electrode for controlling the data driver IC, the common electrode line B (25), and the capacitor element electrode line (3). The display inspection can be performed by passing the entire electrophoretic ink display element (15) included in the electrophoretic display layer of the electrophoretic display substrate through the color filter layer to be discolored to have a color with a predetermined wavelength by applying a voltage capable of discoloring the electrophoretic ink display element (15) by passing through the color filter layer to a space between the first electrode (22) for inspection and the second electrode (23) for inspection.

FIG. 4 is a top view illustrating the electrophoretic display device which mounts the gate driver IC (31), the data driver IC (32), and the flexible cable (33) on the electrophoretic display substrate described in FIG. 3 and to which a controller (34) for operating the electrophoretic display substrate is connected. The gate driver IC (31) is adhered to an installation region of the gate driver IC, the data driver IC (32) is adhered to an installation region of the data driver IC, and the flexible cable (33) is adhered to a connector region using the ACF. In addition, the controller (34) on which a CPU (34a), a memory (34b), a communication device (34c), a battery (34d), and a voltage output device (34e) are mounted is connected to the electrophoretic display substrate using the flexible cable (33).

The common electrode line B (25) and the capacitor element electrode line (3) are connected to respective voltage output terminals (not illustrated) provided on the controller (34) through the flexible cable (33). The controller (34) supplies a common potential to the common electrode lines B (25) and a positive or negative potential to the capacitor element electrode line (3) from these voltage output terminals. The common potential is typically an 0 V. The voltage output device (34e) generates the common potential and the positive or negative potential by receiving the output voltage of the battery (34d), and the potential is output from respective voltage output terminals by the switching element (not illustrated). Moreover, the voltage output device (34e) generates a power supply voltage of the CPU (34a), the memory (34b), and the communication device (34c), and then outputs the power supply voltage.

Moreover, in FIG. 3, the plurality of capacitor element electrode lines (3) are gathered into one line and are commonly connected to the second electrode (23) for inspection which is an electrode pad to be wired to the connector region, but the wiring mode of the capacitor element electrode lines of the present embodiment is not limited thereto. For example, as illustrated in FIG. 5A, a screen is divided into an A region (41a) and a B region (41b), and the capacitor element electrode line electrically separated between the regions may be provided in each of the regions. In this case, for example, the capacitor element electrode line of the A region (41a) is connected to a second electrode (23A) for inspection which is an electrode pad as capacitor element electrode line (3A), and the capacitor element electrode lines of the B region (41b) may be connected to a second electrode (23B) for inspection which is an electrode pad as the capacitor element electrode line (3B). The first electrode (23A) for inspection and the second electrode (23B) for inspection are electrically separated from each other. By employing such a configuration, a voltage can be applied to the A region (41a) and the B region (41b) independently from each other. The region is divided into plural regions so that color display can be performed for each area using the capacitor element electrode lines.

In addition, the number of divisions is not limited to two and may be arbitrarily determined in accordance of the usage thereof. Further, the numbers of capacitor element electrode lines may be different from each other between divided groups. The division mode is not limited to division for each adjacent region, and division may be performed such that one or more capacitor element electrode lines in an arbitrary position constitute one group; for example, pixel rows which are not adjacent to each other and separated from each other belong to the same group. In this manner, in the present embodiment, an arbitrary number of electrode pads commonly connected to some capacitor element electrode lines among the plurality of capacitor element electrode lines may be included in a state in which the electrode pads are electrically separated from each other. Accordingly, the display inspection can be performed by passing the electrophoretic ink display element corresponding to the second electrode for inspection through the color filter layer to be discolored to have a color with a predetermined wavelength by applying a voltage capable of discoloring the electrophoretic ink display element by passing through the color filter layer to a space between the common electrode (14) and at least any one of the selected second electrodes for inspection.

Figure 5B:
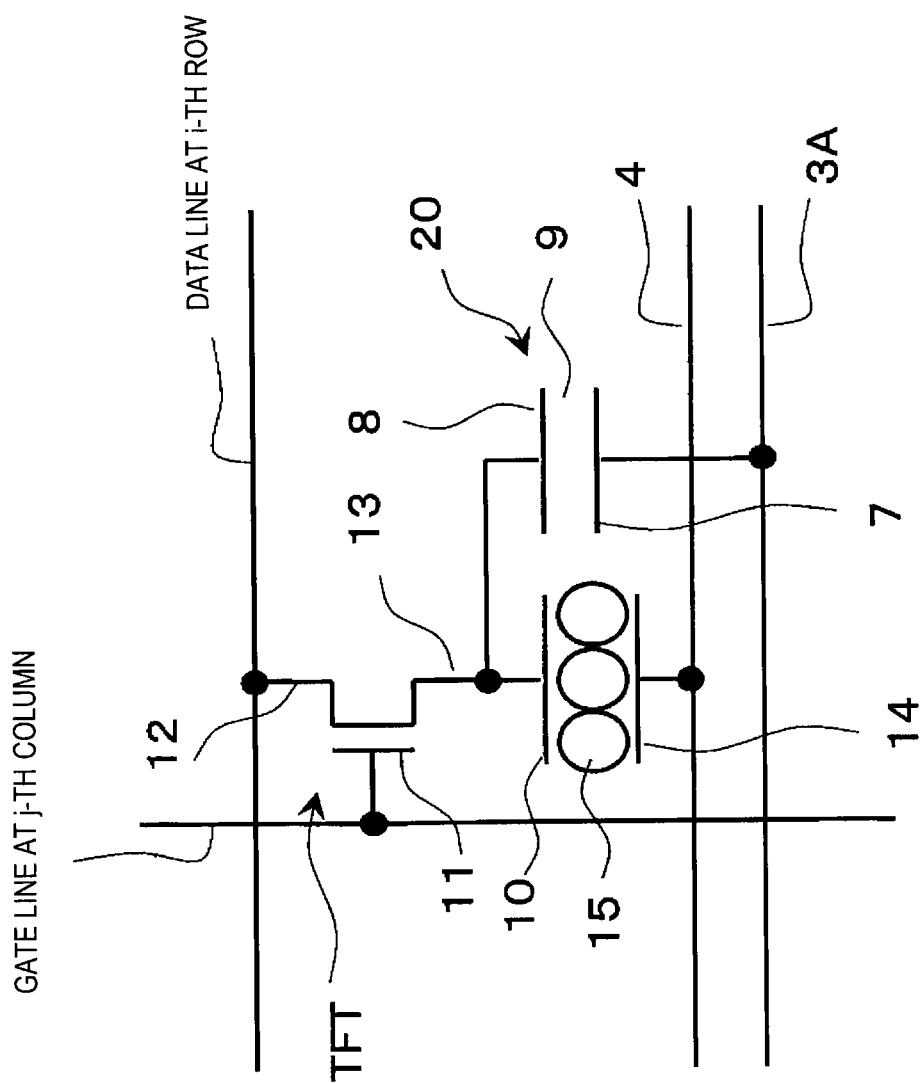
FIG. 5B is a circuit diagram illustrating a pixel configuration in one divided region of the electrophoretic display device of FIG. 5A.

FIG. 5B illustrates an equivalent circuit of one sub pixel of the A region (41a) of FIG. 5A. In addition, FIG. 5C illustrates an equivalent circuit of one sub pixel of the B region (41b) of FIG. 5A. The difference from the equivalent circuit of FIG. 2 is that the capacitor element electrode lines (3) of FIG. 2 are replaced by the capacitor element electrode lines (3A) in FIG. 5B and the capacitor element electrode lines (3) of FIG. 2 are replaced by the capacitor element electrode lines (3B) in FIG. 5C.

On the other hand, in electrophoretic type electronic paper, particles are migrated and an image is displayed by applying a voltage to white and black particles which are charged to an opposite potential for a predetermined time. At this time, it is desirable that the total amount of power applied to respective white and black particles are equivalent (product of voltage and application time), and application of a voltage is performed such that the time for applying a voltage positively or negatively becomes as equivalent as possible in a case where image rewriting of the electronic paper which is driven at a constant voltage is driven. Practically, a technique of changing the method of applying a voltage is adopted by the state before image rewriting, that is, which particles between the white colored particles and the black colored particles being present on the pixel electrode side (or the transparent electrode side of the display surface side). However, in the electronic paper in which image rewriting is repeatedly performed for a long period of time, a phenomenon in which rewriting an image is not made into intended display is generated. This is referred to as ghosting, which is a phenomenon in which influence of the displayed image before rewriting appears in the rewritten image, that is, the image before a new image vaguely remains in the display. In order to recover the electronic paper in which ghosting is generated, it is effective that a voltage higher than the normal voltage is applied or positive and negative are switched with each other at a high speed, but a driver IC which is generally used does not have such a voltage outputting function, and accordingly, the cost is increased when the function is added for recovery of the ghosting. Consequently, a method of allowing the controller 34 to have the outputting function for recovery of the ghosting and to drive electronic paper using a different system without involving the driver IC or the TFT is practical. The output voltage for recovery of the ghosting is generated by, for example, the voltage output device (34e) and applied to the capacitor element electrode lines (3, 3A, 3B).

Moreover, the electrophoretic display substrate of the present invention is suitable for driving electronic paper of multi-color display. In the related art, for example, when electronic paper of three color display having three kinds of particles which are first white particles, second black particles, and third red particles in the electrophoretic particles is driven, a voltage having three kinds of different potentials is applied by passing through the TFT of pixels to particles having different charged amounts (white: +15 V, black: −15 V, red: +5 V) due to the colors in general. At this time, it is necessary to employ three values of +15 V, −15 V, and +5 V for voltage output by the driver IC (data driver IC). For example, in a case where the charged amount of blue particles is different from that of red particles at the time of changing only the third particles, for example, from white, black, and red systems to white, black, and blue systems, change into the driver IC capable of outputting the voltage in accordance with the above-described case is necessary, and accordingly, versatility of driving components such as the TFT or the driver IC is degraded.

Meanwhile, in the TFT substrate included in the electrophoretic display substrate, a voltage can be applied to the electrophoretic particles without involving the TFT of pixels. Since there is a circuit via the capacitor element electrode lines (3, 3A, 3B), it is possible for white and black particles to be set as driven from the TFT of pixels and the driver IC (data driver IC (32)), and for blue particles to be set as driven from the voltage output device (34e) provided on the capacitor element (20) and the controller (34), and it is possible to easily correspond to an electrophoretic voltage of third particles by changing the setting of the voltage output device (34e) of the controller (34).

Moreover, since electrophoretic type electronic paper is a reflection type display, visibility in a dark place is low. Accordingly, a device is devised to be illuminated with light or front light is devised to be installed on the display surface for brightness. However, a method of separately installing light sources is not preferable because the thinness which is a characteristic of the electronic paper is sacrificed. Here, a method of providing a light emitting layer in a display element of electronic paper is examined. In this method, visibility is secured in a dark place using emitting light of inorganic electroluminescence which is emitted due to application of an AC voltage. However, in a case of employing this method, it is necessary to devise a driving device. The electrophoretic type electronic paper has a low driving voltage of approximately 15 V and can be operated using a TFT having a configuration which is not so different from a normal amorphous silicon TFT designed for an LCD, and the production cost can be suppressed to be low. However, it is necessary to apply a high voltage for allowing the inorganic electroluminescence element to emit light, and a special design such as thickening a gate insulation film or the like is needed for increasing a withstand voltage of the TFT.

Figure 6A:
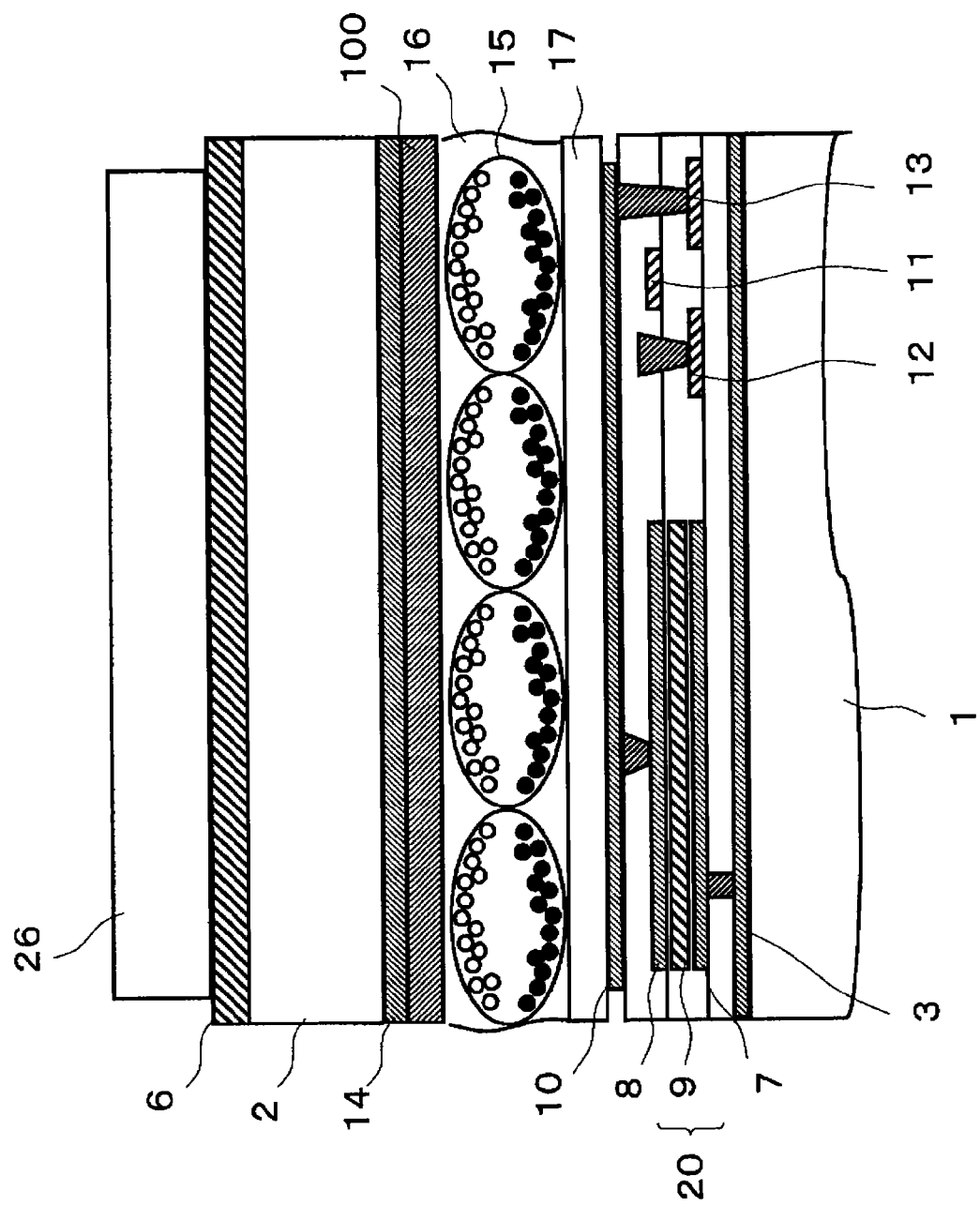
FIG. 6A is a cross-sectional view illustrating the configuration of the electrophoretic display substrate according to an embodiment of the present invention, which includes a first inorganic electroluminescence element.
Figure 6B:
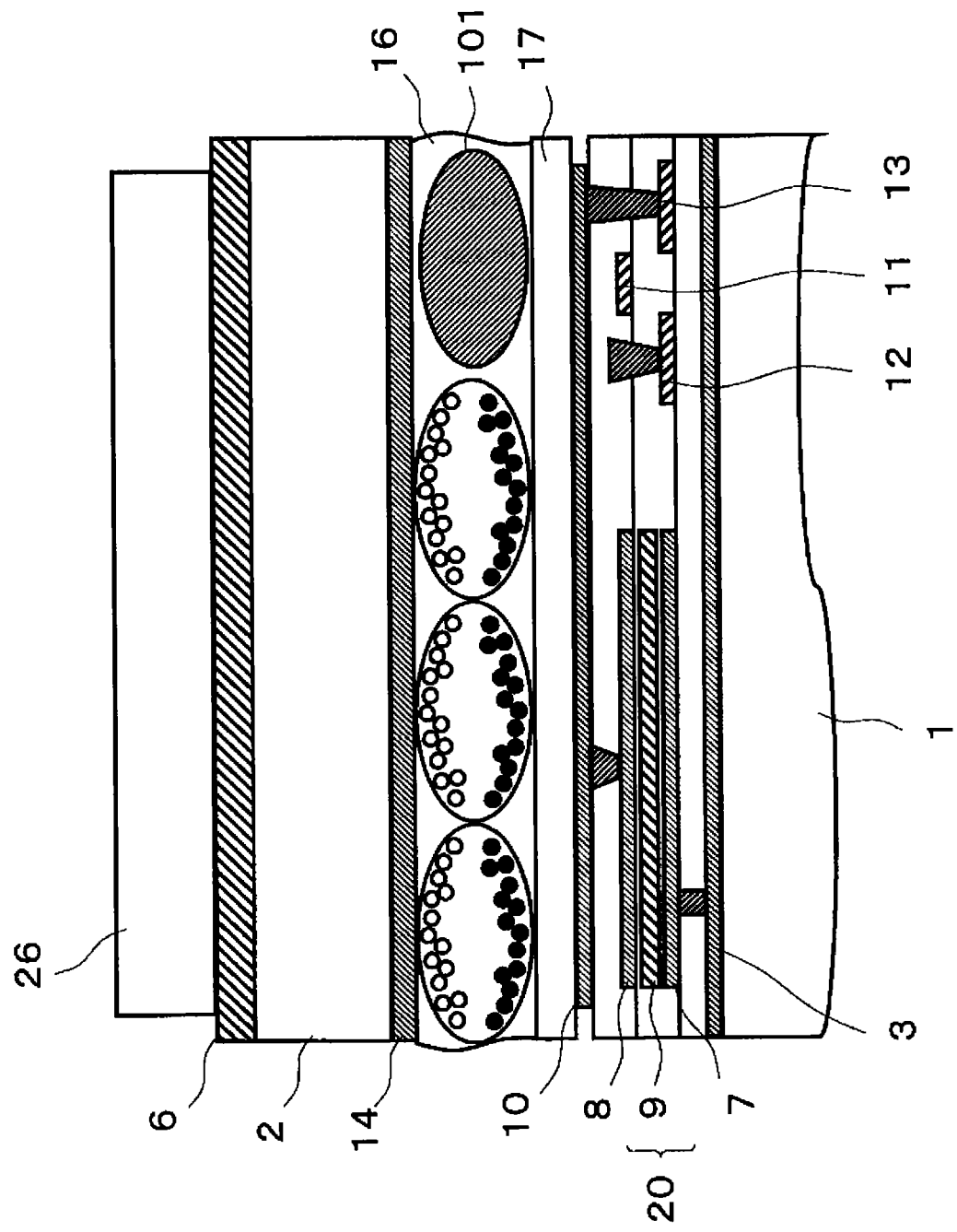
FIG. 6B is a cross-sectional view illustrating the configuration of the electrophoretic display substrate according to an embodiment of the present invention, which includes a second inorganic electroluminescence element.

An element in which zinc sulfide is doped with copper or manganese is used as the inorganic electroluminescence element, and examples thereof include a thin film-type inorganic electroluminescence element (100) thinly formed on the transparent electrode (common electrode (14)) of the second substrate (2) as illustrated in FIG. 6A and a dispersion-type inorganic electroluminescence element (101) which is mixed with the microcapsule of the electrophoretic ink display element as illustrated in FIG. 6B. These inorganic electroluminescence elements use the sub pixel electrode (10) and the common electrode (14) as voltage application electrodes. The AC voltage output is performed by mounting a DC-AC inverter (34f) which converts the DC voltage to the AC voltage on the controller (34) as illustrated in FIG. 6C. The AC voltage output at this time is preferably in the range of 400 Hz to 2000 Hz and 100 V to 200 V.

EXAMPLES

Hereinafter, Examples of the present invention will be described. In addition, the present invention is not limited to Examples described below.

An electrophoretic display substrate having an opposite angle of 3 inches with a cross-sectional structure illustrated in FIGS. 1A and 1B is prepared. Alkali-free glass having a thickness of 0.7 mm is used as the first substrate (1). The sub pixel electrode (10) having 720 rows and 320 columns (side in the row direction: approximately 80 μm, side in the column direction: approximately 240 μm) is arranged in rows and columns on the surface thereof, and the TFTs and the capacitor elements (20) are respectively connected to the sub pixel electrode (10) one by one. The sub pixel electrode (10), the TFTs, and the capacitor elements (20), and various electrode lines connecting these to one another are prepared using a plasma vapor phase deposition method at a process temperature of approximately 400° C. These are made into a TFT substrate.

The microcapsule-type electrophoretic ink display element (15) is used for a display portion. A PET film having a thickness of 100 μm is formed as the second substrate (2) and an ITO film having a film thickness of 1000 angstrom is formed as a transparent conductive film using a sputtering method, and the surface of the ITO film is coated with a liquid to which microcapsules are dispersed using a binder resin having a urethane resin as a main component, and then the resultant is dried to form a microcapsule display layer having a thickness of 40 The microcapsule display layer is coated with a conductive adhesive having an acrylic resin as a main component and dried to form an adhesive surface, and then the resultant is adhered to the surface of the sub pixel electrode (10) of the TFT substrate using a heated laminator at 80° C. A part of the ITO film of the PET film which is the second substrate (2) is connected to the common electrode lines on a glass plate on which the TFT which is the second substrate (2), the capacitor element, or various wirings are formed using the conductive adhesive (5) having silver as a main component, thereby preparing an electrophoretic display substrate.

Next, a surface on which the ITO film of the second substrate (2) is not formed is coated with a transparent resin having a urethane resin as a main component and then dried to form an ink receiving layer (6) having a film thickness of 10 μm. Each of 240 color pixels with a side having a length of approximately 70 μm in the row direction and a side having a length of 77 mm in the column direction of the sub pixel electrode (10) is formed by repeatedly performing ink-jet printing in an order of red, green, and blue in the row direction on the ink receiving layer (6) of the second substrate (2) such that the color pixels having respective colors are positioned in a position corresponding to the sub pixel electrode (10) of the first substrate (1).

When the color of the prepared electrophoretic display substrate is confirmed, the color is dark gray in the entire area and bright regions are irregularly seen. This is because the white particles and the black particles are mixed in each of the capsules in the process of preparing microcapsules and the white particles and the black particles are partially migrated by static electricity generated when the microcapsule display layer is adhered to the sub pixel electrode (10) of the first substrate (1).

Subsequently, inspection of the color filter is performed after the microcapsule display layer is put in a white coloring state by applying a voltage of +15 V to the capacitor element electrode lines (3) for 200 milliseconds using the common electrode line (4) on the first substrate (1) as a reference potential. Since omission of one pixel among blue color pixels are found, the blue color pixel in the omitted portion is reprinted by ink-jet printing. Next, a protective film in which a water vapor barrier layer made of silicon oxide film and a hard coat layer are laminated on a transparent PET film having a thickness of 100 μm is adhered to the color filter using a transparent acrylic adhesive, the resultant is put into an autoclave of 0.45 MPa at 60° C. and subjected to a heating and pressurizing process for 20 minutes, and minute bubbles present among laminated layers of respective members in the preparation process are dissolved in various resins constituting the electrophoretic display substrate. Next, the outer periphery is sealed with an epoxy-based sealant, and the gate driver IC, the data driver IC, the controller, and the flexible cable for connection are adhered to one another with the ACF, thereby preparing a full color electrophoretic display substrate in 240 rows and 320 columns.

Next, the controller on which the CPU, the memory, the communication device, and the battery are mounted is connected to the flexible cable, image data is transmitted to the electrophoretic substrate, and a full color image can be displayed.

In an electrophoretic display substrate capable of expressing three primary colors, examples of a method of displaying three primary colors include a method (first method) of arranging display elements in which particles or a colored liquid is colored by R, G, and B or C, M, and Y such that one color among three primary colors can be displayed in a unit of a sub pixel electrode such as a TFT; and a method (second method) of adhering a color filter colored by R, G, and B or C, M, and Y to a position in accordance with the sub pixel electrode such as a TFT on a display surface of an electrophoretic display substrate capable of performing white and black display.

In the first method, display with high purity of colors can be expected because three primary colors are displayed by the colors of the display elements itself, but there is a problem in that a process of preparing the electrophoretic display substrate becomes complicated due to the necessity of arrangement of display elements in a unit of a sub pixel electrode such as a TFT.

Meanwhile, the second method is a method in which an electrophoretic display substrate of white and black display, which has been practically used, is used as a display element and a full color image is displayed by adding a color filter with three primary colors, and can be realized without a complicating process. However, there is a defect in expressible color spectrum which becomes narrower than that of the first method because a color filter is used.

In order to improve the defect in the expressible color spectrum which becomes narrower, it is considered that transparency of an adhesive for adhering a color filter is increased to reduce loss of light passing through the color filter, and a color filter having color pixels having a size which is approximately the same as the sub pixel electrode of a TFT is adhered with high position accuracy and the light reflected on the electrophoretic ink display element is effectively received by the color filter.

There is a defect in the expressible color spectrum which becomes narrower due to colorization of the electrophoretic display substrate using a color filter, and, as a method for improvement, improvement in transparency of an adhesive which adheres the color filter, expansion of color pixels of the color filter, and positioning of the substrate to TFT pixels with high precision can be considered and the inventors have conducted investigation. However, when the size of the color pixel becomes close to the size of the TFT pixel of the substrate, the allowable amount of position deviation at the time of adhesion becomes small and the color pixel covers the TFT pixel positioned next to the target TFT pixel even by slight position deviation, and, as a result, the expressible color spectrum becomes significantly decreased.

For this reason, the inventors have repeatedly conducted intensive research and have found a method of forming color pixels directly on a display surface of an electrophoretic display substrate. This is a method of printing color pixels in a position corresponding to a pixel position of the TFT on a display surface of an existing electrophoretic display substrate capable of performing white and black display using various printing methods. The following processes are investigated for preparing a color electrophoretic display substrate on which color pixels are directly formed without adding a large modification to the process of preparing the existing electrophoretic display substrate of white and black display.

1. Adhesion of front plane laminate of electrophoretic display to TFT substrate
2. Coating and forming ink receiving layer on front plane laminate
3. Printing and forming color pixels
4. Adhesion of protective film
5. Autoclave treatment 6. Sealing outer peripheral portion of front plane laminate with adhesive in moisture-proof manner 7. Adhering driver IC and flexible cable to TFT substrate with ACF (Anisotropic Conductive Film)

8. Image display through connection to controller substrate

In the process of preparing the color electrophoretic display substrate, processes to be added to the process of preparing the existing electrophoretic display substrate capable of performing white and black display are only two processes of the second and third processes above.

Patent Literature

PTL 1: Japanese Patent No. 3837948

However, in the case of preparing the color electrophoretic display substrate with the above-described processes, it is understood that inspection of a color filter is difficult to perform at a stage of printing and forming color pixels. In general, the color filter is formed of a transparent substrate, and the size, color density, and presence of omission of the color pixels are confirmed in the inspection process. During this time, the color pixels are confirmed one by one using the same light source or backgrounds having the same color. However, in the color filter directly formed on the electrophoretic display substrate, the color of the electrophoretic ink display element serving as a background is not constant for each substrate or each site in the substrate and the pattern thereof is irregular. This is because electrophoretic particles in the electrophoretic ink display element are moved due to static electricity while the front surface plate of the electrophoretic display is adhered to the TFT substrate and a coloring state which is not constant for each electrophoretic ink display element is made.

In order to make the coloring state constant, it is necessary to apply a constant voltage to whole electrophoretic ink display elements. For this purpose, it is necessary to mount a driver IC for driving the TFT and a flexible cable for electrical connection with a controller on the TFT substrate. However, when these components are implemented on the TFT substrate, adhesion of a protective film of the fourth process above is difficult to cause, and accordingly, considerable change of the existing process becomes necessary. In addition, in a case where a defect is found in the color filter, the components mounted for coloring the electrophoretic ink display element become useless.

In light of the above-described problems, an object of the present invention is to provide an electrophoretic display substrate using a TFT substrate capable of coloring an electrophoretic ink display element with a constant color without mounting a component such as a driver IC or a flexible cable on the TFT substrate, a method of inspecting the same, and an electrophoretic display device for performing inspection of a color filter directly formed on the electrophoretic display substrate.

For solving the above-described problems, an embodiment of the present invention is to provide an electrophoretic display substrate including a first substrate; a second substrate; and an electrophoretic display layer interposed between the first substrate and the second substrate, in which the electrophoretic display layer includes a dispersion medium and at least one kind of electrophoretic ink display element which is positively or negatively charged, the first substrate includes a plurality of gate lines, a plurality of data lines, a thin film transistor arranged on intersection points between each of the gate lines and each of the data lines, a sub pixel electrode, a capacitor element including a first electrode and a second electrode, a plurality of capacitor element electrode lines, and common electrode lines, one of a source terminal and a drain terminal of the thin film transistor is connected to the data line, the other one of the source terminal and the drain terminal of the thin film transistor is connected to the sub pixel electrode and the first electrode of the capacitor element, the capacitor element electrode lines are connected to the second electrode of the capacitor element, a common electrode is formed on one surface of the second substrate and a color filter layer is formed on the other surface, the common electrode is connected to the common electrode lines of the first substrate, and the color filter layer includes a transparent resin which is laminated on the second substrate and color filter pixels which are formed on the transparent resin.

Preferably, the electrophoretic display layer including the electrophoretic ink display element performs microcapsule-type electrophoretic display. Also preferably, the electrophoretic display layer including the electrophoretic ink display element performs microcup-type electrophoretic display. Still more preferably, the color filter layer is a color filter having the color filter pixels with three primary colors of red, green, and blue or cyan, magenta, and yellow.

In addition, the first substrate may include an electrode pad respectively connected to the plurality of capacitor element electrode lines in common. Further, the first substrate may include a plurality of electrode pads commonly connected to some capacitor element electrode lines among the plurality of capacitor element electrode lines in a state in which the electrode pads are electrically separated from each other.

Moreover, an inorganic electroluminescence element using the sub pixel electrode and the common electrode as voltage application electrode may be further included. For example, the inorganic electroluminescence element is a thin film-type inorganic electroluminescence element or a dispersion-type inorganic electroluminescence element.

Further, an embodiment of the present invention is to provide an electrophoretic display device including the electrophoretic display substrate and a voltage output device which generates voltages including a voltage applied to the capacitor element electrode lines. Furthermore, an embodiment of the present invention is to provide an electrophoretic display device including the electrophoretic display substrate; a voltage output device which generates voltages including a voltage applied to the capacitor element electrode lines; and a DC-AC inverter which generates a voltage used for application to the inorganic electroluminescence element by converting a DC output voltage of the voltage output device into an AC voltage.

Further, an embodiment of the present invention is to provide a method of inspecting an electrophoretic display substrate including, with respect to the electrophoretic display substrate, performing display inspection by passing whole electrophoretic ink display elements included in the electrophoretic display layer of the electrophoretic display substrate through the color filter layer to be discolored to have a color with a predetermined wavelength by applying a voltage capable of discoloring the electrophoretic ink display element by passing through the color filter layer to a space between a first electrode for inspection which is provided in the first substrate and connected to the common electrode lines and a second electrode for inspection which is provided in the first substrate and connected to the capacitor element electrode lines.

Further, an embodiment of the present invention is to provide a method of inspecting an electrophoretic display substrate including, with respect to the electrophoretic display substrate which includes an electrode pad respectively connected to the plurality of capacitor element electrode lines in common, performing display inspection by passing whole electrophoretic ink display elements included in the electrophoretic display layer of the electrophoretic display substrate through the color filter layer to be discolored to have a color with a predetermined wavelength by applying a voltage capable of discoloring the electrophoretic ink display element by passing through the color filter layer to a space between a first electrode for inspection which is provided in the first substrate and connected to the common electrode lines and a second electrode for inspection which is provided in the first substrate and formed of the electrode pad connected to the capacitor element electrode lines.

Further, an embodiment of the present invention is to provide a method of inspecting an electrophoretic display substrate including, with respect to the electrophoretic display substrate which includes a plurality of electrode pads commonly connected to some capacitor element electrode lines among the plurality of capacitor element electrode lines in a state in which the electrode pads are electrically separated from each other, performing display inspection by passing an electrophoretic ink display element corresponding to at least any one second electrode for inspection, among whole electrophoretic ink display elements included in the electrophoretic display layer of the electrophoretic display substrate, through the color filter layer to be discolored to have a color with a predetermined wavelength by applying a voltage capable of discoloring the electrophoretic ink display element by passing through the color filter layer to at least any one space between a first electrode for inspection which is provided in the first substrate and connected to the common electrode lines and a second electrode for inspection which is provided in the first substrate and formed of the electrode pads connected to the capacitor element electrode lines.

According to embodiments of the present invention, a voltage can be applied to whole sub pixel electrodes and a common electrode and an electrophoretic display element of an electrophoretic display layer can be allowed to be discolored to have a color with a predetermined wavelength without driving a thin film transistor present in each sub pixel. It is possible to inspect a color filter formed on the electrophoretic display layer without mounting a driver IC for driving the TFT or a flexible cable for electrical connection to a controller on a TFT substrate.

INDUSTRIAL APPLICABILITY

The present invention can be applied to a display device such as electronic paper and the like.

DESCRIPTION OF REFERENCE NUMERALS

1: first substrate
2: second substrate
3, 3A, 3B: capacitor element electrode line
4: common electrode line
5: conductive adhesive including metal as main component
6: ink receiving layer
7: second electrode
8: first electrode
9: dielectric film
10: sub pixel electrode
11: gate terminal
12: source terminal
13: drain terminal
14: common electrode (ITO film)
15: electrophoretic ink display element
16: binder resin
17: conductive adhesive layer
18: white particles
19: black particles
20: capacitor element
21: common electrode connecting portion
22: first electrode for inspection
23, 23A, 23B: second electrode for inspection
24: common electrode connecting portion
25: common electrode line
26: red color pixel
27: green color pixel
28: blue color pixel
29: pixel
31: gate driver IC
32: data driver IC
33: flexible cable
34: controller
34a: CPU
34b: memory
34c: communication device
34d: battery
34e: voltage output device
34f: DC-AC inverter
41a: A region
41b: B region
100: thin film-type inorganic electroluminescence element
101: dispersion-type inorganic electroluminescence element Obviously, numerous modifications and variations of the present invention are possible in light of the above teachings. It is therefore to be understood that within the scope of the appended claims, the invention may be practiced otherwise than as specifically described herein.

The invention claimed is:

1. An electrophoretic display substrate, comprising:
a first substrate;
a second substrate; and
an electrophoretic display layer interposed between the first substrate and the second substrate, the electrophoretic display layer including at least one electrophoretic ink display element which is positively or negatively charged,
wherein
the first substrate includes
a thin film transistor positioned at an intersection between a gate line and a data line,
a sub pixel electrode,
a capacitor element including a first electrode and a second electrode,
a plurality of capacitor element electrode lines connected to the second electrode, and
a plurality of common electrode lines,
the thin film transistor has a source terminal and a drain terminal and is configured such that one of the source and drain terminals is connected to the data line, and that the other of the source and drain terminals is connected to the sub pixel electrode and the first electrode of the capacitor element,
the second substrate has a first surface on which a common electrode is formed and a second surface on which a color filter layer is formed,
the common electrode is connected to the common electrode lines of the first substrate, and the color filter layer includes a transparent resin which is laminated on the second substrate and color filter pixels which are formed on the transparent resin.

2. The electrophoretic display substrate according to claim 1, wherein the electrophoretic display layer is configured to perform microcapsule-type electrophoretic display.

3. The electrophoretic display substrate according to claim 2, wherein the color filter layer includes the color filter pixels having three primary colors of red, green, and blue or cyan, magenta, and yellow.

4. The electrophoretic display substrate according to claim 1, wherein the electrophoretic display layer is configured to perform microcup-type electrophoretic display.

5. The electrophoretic display substrate according to claim 1, wherein the first substrate includes an electrode pad connected to each of the capacitor element electrode lines.

6. A method of inspecting an electrophoretic display substrate, comprising:
performing display inspection on the electrophoretic display substrate according to claim 5,
wherein the performing comprises applying a voltage between a first inspection electrode and a second inspection electrode such that a color for inspection is displayed by the electrophoretic ink display elements through the color filter layer, and the first substrate has the first inspection electrode which is connected to the common electrode lines and the second inspection electrode which is formed by the electrode pads connected to the capacitor element electrode lines.

7. The electrophoretic display substrate according to claim 1, wherein the first substrate includes a plurality of electrode pads each connected to a group of capacitor element electrode lines among the plurality of capacitor element electrode lines, and the electrode pads are electrically separated from one another.

8. A method of inspecting an electrophoretic display substrate, comprising:
performing display inspection on the electrophoretic display substrate according to claim 7,
wherein the performing comprises applying a voltage between a first inspection electrode and at least one of second inspection electrodes such that a color for inspection is displayed by a group of electrophoretic ink display elements through the color filter layer, the first substrate has the first inspection electrode connected to the common electrode lines, the first substrate has the second inspection electrodes formed by the electrode pads connected to the capacitor element electrode lines, and the group of electrophoretic ink display elements are among the plurality of electrophoretic ink display elements included in the electrophoretic display layer and correspond to the at least one of the second inspection electrodes to which the voltage is applied.

9. The electrophoretic display substrate according to claim 1, further comprising:
an inorganic electroluminescence element having the sub pixel electrode and the common electrode as a voltage application electrode.

10. The electrophoretic display substrate according to claim 9, wherein the inorganic electroluminescence element is a thin film-type inorganic electroluminescence element or a dispersion-type inorganic electroluminescence element.

11. An electrophoretic display device, comprising:
the electrophoretic display substrate according to claim 10;
a voltage output device configured to generate voltages including a voltage applied to the capacitor element electrode lines; and
a DC-AC inverter configured to generate a voltage for application to the inorganic electroluminescence element by converting a DC output voltage of the voltage output device into an AC voltage.

12. An electrophoretic display device, comprising:
the electrophoretic display substrate according to claim 1; and
a voltage output device configured to generate voltages including a voltage applied to the capacitor element electrode lines.

13. A method of inspecting an electrophoretic display substrate, comprising:
performing display inspection on the electrophoretic display substrate according to claim 1,
wherein the performing comprises applying a voltage between a first inspection electrode and a second inspection electrode such that a color for inspection is displayed by the electrophoretic ink display elements through the color filter layer, and the first substrate has the first inspection electrode which is connected to the common electrode lines and the second inspection electrode which is connected to the capacitor element electrode lines.

14. The electrophoretic display substrate according to claim 1, wherein the common electrode lines are formed in a same layer as the sub pixel electrode.

15. The electrophoretic display substrate according to claim 1, wherein the common electrode is connected to the common electrode lines of the first substrate via a conductive adhesive.

16. The electrophoretic display substrate according to claim 15, wherein the conductive adhesive contains a metal.

17. The electrophoretic display substrate according to claim 16, wherein the conductive adhesive contains silver.

18. The electrophoretic display substrate according to claim 1, wherein the common electrode lines are formed outside a footprint of the electrophoretic display layer.

19. The electrophoretic display substrate according to claim 1, wherein the first substrate includes a plurality of sub pixel electrodes.

20. The electrophoretic display substrate according to claim 1, wherein the first substrate includes a plurality of capacitor elements.

* * * * *